United States Patent
Andrade

(10) Patent No.: US 7,256,589 B2
(45) Date of Patent: Aug. 14, 2007

(54) CAPACITIVE SENSOR SYSTEM WITH IMPROVED CAPACITANCE MEASURING SENSITIVITY

(75) Inventor: Thomas L. Andrade, Los Gatos, CA (US)

(73) Assignee: Atrua Technologies, Inc., Campbell, CA (US)

( * ) Notice: Subject to any disclaimer, the term of this patent is extended or adjusted under 35 U.S.C. 154(b) by 0 days.

(21) Appl. No.: 10/134,042

(22) Filed: Apr. 25, 2002

(65) Prior Publication Data

US 2003/0016849 A1    Jan. 23, 2003

Related U.S. Application Data

(60) Provisional application No. 60/292,857, filed on May 22, 2001, provisional application No. 60/287,230, filed on Apr. 27, 2001.

(51) Int. Cl.
G01R 27/26     (2006.01)
G06K 9/00      (2006.01)

(52) U.S. Cl. .................. 324/687; 324/662; 324/671; 382/124

(58) Field of Classification Search ............... 324/662, 324/678, 663, 677, 686, 687, 763, 765, 671; 382/124; 73/862.046
See application file for complete search history.

(56) References Cited

U.S. PATENT DOCUMENTS

| | | | |
|---|---|---|---|
| 4,210,899 A | 7/1980 | Swonger et al. | |
| 4,353,056 A | 10/1982 | Tsikos | |
| 4,429,413 A | 1/1984 | Edwards | |
| 4,435,056 A | 3/1984 | Tanikawa | |
| 4,526,043 A | 7/1985 | Boie et al. | |
| 4,577,345 A | 3/1986 | Abramov | |
| 4,785,338 A | 11/1988 | Kinoshita et al. | |
| 4,860,232 A * | 8/1989 | Lee et al. | 702/104 |
| 5,051,802 A | 9/1991 | Prost et al. | |
| 5,166,679 A | 11/1992 | Vranish et al. | |
| 5,195,145 A | 3/1993 | Backus et al. | |
| 5,207,102 A | 5/1993 | Takahashi et al. | |
| 5,214,388 A | 5/1993 | Vranish et al. | |

(Continued)

FOREIGN PATENT DOCUMENTS

EP    0 929 050 A2    7/1999

(Continued)

OTHER PUBLICATIONS

Veridicom, Inc., "FPS110, FPS110B, FPS110E Solid State Fingerprint Sensor," Document #02-0053-01, Revision F, Jan. 26, 2001, pp. 1-17.

(Continued)

*Primary Examiner*—James C Kerveros
(74) *Attorney, Agent, or Firm*—Perkins Coie LLP

(57) ABSTRACT

A capacitance sensor system and method includes a capacitive sensor as an array of sensor electrodes near the surface of the integrated circuit and charge pump circuits for measuring the capacitance at each sensor electrode. Shield electrodes and unused sense electrodes are used for background capacitance cancellation at each array location. The shield electrodes are switched between the circuit supply potentials in a manner synchronous to the capacitance sensing at the sense electrodes. The improved background capacitance cancellation allows all circuitry to be located outside the sensor array. The capacitance data is used to determine the positions of fingerprint artifacts and other fingerprint features.

42 Claims, 11 Drawing Sheets

U.S. PATENT DOCUMENTS

| | | |
|---|---|---|
| 5,264,393 A | 11/1993 | Tamura et al. |
| 5,325,442 A | 6/1994 | Knapp |
| 5,373,245 A | 12/1994 | Vranish |
| 5,382,310 A | 1/1995 | Ozimek et al. |
| 5,424,249 A | 6/1995 | Ishibashi et al. |
| 5,429,006 A | 7/1995 | Tamori |
| 5,434,446 A | 7/1995 | Hilton et al. |
| 5,442,347 A | 8/1995 | Vranish |
| 5,485,011 A | 1/1996 | Lee et al. |
| 5,539,292 A | 7/1996 | Vranish |
| 5,559,504 A | 9/1996 | Itsumi et al. |
| 5,559,961 A | 9/1996 | Blonder |
| 5,576,763 A | 11/1996 | Ackland et al. |
| 5,577,120 A | 11/1996 | Penzias |
| 5,602,585 A | 2/1997 | Dickinson et al. |
| 5,622,873 A | 4/1997 | Kim et al. |
| 5,625,304 A | 4/1997 | Azadet et al. |
| 5,631,704 A | 5/1997 | Dickinson et al. |
| 5,668,874 A | 9/1997 | Kristol et al. |
| 5,673,123 A | 9/1997 | Dickinson |
| 5,739,562 A | 4/1998 | Ackland et al. |
| 5,748,448 A | 5/1998 | Hokari |
| 5,764,789 A | 6/1998 | Pare, Jr. et al. |
| 5,778,089 A | 7/1998 | Borza |
| 5,805,422 A | 9/1998 | Otake et al. |
| 5,822,030 A | 10/1998 | Uchiyama |
| 5,824,950 A | 10/1998 | Mosley et al. |
| 5,825,907 A | 10/1998 | Russo |
| 5,828,773 A | 10/1998 | Setlak et al. |
| 5,835,141 A | 11/1998 | Ackland et al. |
| 5,844,486 A | 12/1998 | Kithil et al. |
| 5,862,248 A | 1/1999 | Salatino et al. |
| 5,864,296 A | 1/1999 | Upton |
| 5,867,368 A | 2/1999 | Glenn |
| 5,869,791 A | 2/1999 | Young |
| 5,901,046 A | 5/1999 | Ohta et al. |
| 5,903,225 A | 5/1999 | Schmitt et al. |
| 5,920,640 A | 7/1999 | Salatino et al. |
| 5,940,526 A | 8/1999 | Setlak et al. |
| 5,963,679 A | 10/1999 | Stelak |
| 5,978,496 A | 11/1999 | Harkin |
| 5,987,156 A | 11/1999 | Ackland et al. |
| 5,991,408 A | 11/1999 | Pearson et al. |
| 6,011,859 A | 1/2000 | Kalnitsky et al. |
| 6,016,355 A | 1/2000 | Dickinson et al. |
| 6,028,773 A | 2/2000 | Hundt |
| 6,049,620 A | 4/2000 | Dickinson et al. |
| 6,055,324 A | 4/2000 | Fujieda |
| 6,061,464 A | 5/2000 | Leger |
| 6,069,970 A | 5/2000 | Salatino et al. |
| 6,097,195 A | 8/2000 | Ackland et al. |
| 6,114,862 A | 9/2000 | Tartagni et al. |
| 6,130,448 A | 10/2000 | Bauer et al. |
| 6,191,593 B1 | 2/2001 | Tartagni et al. |
| 6,192,142 B1 | 2/2001 | Pare, Jr. et al. |
| 6,195,447 B1 | 2/2001 | Ross |
| 6,208,264 B1 | 3/2001 | Bradney et al. |
| 6,211,936 B1 | 4/2001 | Nakamura |
| 6,214,634 B1 | 4/2001 | Osajda et al. |
| 6,246,566 B1 | 6/2001 | Glenn |
| 6,259,804 B1 | 7/2001 | Setlak et al. |
| 6,260,300 B1 | 7/2001 | Klebes et al. |
| 6,268,231 B1 | 7/2001 | Wetzel |
| 6,289,114 B1 | 9/2001 | Mainguet |
| 6,317,508 B1 | 11/2001 | Kramer et al. |
| 6,320,394 B1 | 11/2001 | Tartagni |
| 6,330,345 B1 | 12/2001 | Russo et al. |
| 6,342,406 B1 | 1/2002 | Glenn et al. |
| 6,362,633 B1 | 3/2002 | Tartagni |
| 6,365,888 B2 | 4/2002 | Von Basse et al. |
| 6,396,116 B1 | 5/2002 | Kelly et al. |
| 6,437,583 B1 | 8/2002 | Tartagni et al. |
| 6,438,257 B1 * | 8/2002 | Morimura et al. .......... 382/124 |
| 6,459,804 B2 | 10/2002 | Mainguet |
| 6,483,931 B2 * | 11/2002 | Kalnitsky et al. ............ 382/124 |
| 6,496,021 B2 | 12/2002 | Tartagni et al. |
| 6,501,846 B1 | 12/2002 | Dickinson et al. |
| 6,515,269 B1 | 2/2003 | Webster et al. |
| 6,518,560 B1 | 2/2003 | Yeh et al. |
| 6,535,622 B1 | 3/2003 | Russo et al. |
| 6,538,456 B1 | 3/2003 | Dickinson et al. |
| 6,546,122 B1 | 4/2003 | Russo |
| 6,583,632 B2 | 6/2003 | Von Basse et al. |
| 2001/0017548 A1 * | 8/2001 | Basse et al. ................. 324/678 |
| 2002/0180464 A1 | 12/2002 | Tartagni |

FOREIGN PATENT DOCUMENTS

| | | |
|---|---|---|
| JP | 11253428 | 9/1999 |

OTHER PUBLICATIONS

Atmel, Inc., "Thermal Fingerprint Sensor with 0.4 mm×14 mm (0.02"×0.55") Sensing Area and Digital Output (On-chip ADC), FCD4B14 FingerChip™," Revision 1962C, Jan. 2002, pp. 1-20.

Infineon Technologies Inc., "Microsystems for Biometrics, FingerTIP™, FTF 1100 MF1 V2.O, CMOS Chip and System", Data Book 3.3, May 2000, pp. 1-38.

* cited by examiner

CAPACITIVE SENSOR SYSTEM WITH IMPROVED CAPACITANCE MEASURING SENSITIVITY

CROSS REFERENCE TO RELATED APPLICATIONS

This application claims the benefit of priority under 35 U.S.C. 119(e) to U.S. Provisional Patent Application Ser. No. 60/287,230 filed on Apr. 27, 2001 and to U.S. Provisional Patent Application Ser. No. 60/292,857 filed on May 22, 2001; each of which applications are hereby incorporated herein by reference in their entirety.

FIELD OF THE INVENTION

The present invention relates generally to capacitive sensor devices, systems, and methods; and more particularly to improved capacitance sensor devices, systems, and methods as are suitable to be fabricated with integrated circuit technology for use in sensing arrays that measure the position of fingerprint artifacts or other electrically conductive structures near the sensor surface.

BACKGROUND

Heretofore, the performance of capacitance based sensing or capacitive sensors have been limited. Depending on the physical structure, the capacitance between a target electrode and a sense electrode varies inversely proportional to the relative distance between them, inversely proportional to the relative distance between them squared, or some functional dependence between inverse and inverse quadratic. The maximum distance at which a capacitance sensor system can detect target conductors in the vicinity of its sensor area is dependent on the minimum capacitance the system can resolve. If the capacitance of the sensor electrode relative to its ambient environment, its reference capacitance, is large compared to the capacitance between the target electrode and the sensor electrode, the capacitance sensor system sensitivity is significantly degraded. The sensor electrode has significant reference capacitance alone. The size of the sensor electrode is dictated by the size of fingerprint artifacts, which is typically about the size of a 100 micrometer square. Being part of an integrated circuit whose vertical dimensions are small compared to 100 micrometers, the sensor electrode itself has significant capacitance to the substrate on which it physically or mechanically rests.

For use in measuring the positions of fingerprint artifacts, a sensor array composed of a rectangular grid of sensor electrodes was disclosed by Knapp in U.S. Pat. No. 5,325,442. Each sense electrode is connected through a passive switch to array wiring that is the length of the array. The array wire is connected to a charge sensing circuit to determine the capacitance. The capacitance sensitivity is degraded by the array wiring as the effective reference capacitance on each sensor electrode increased. Additionally, semiconductor switches are introduced into the sensor area where they may be damaged by mechanical contact with the target electrode, or may leak due to photocurrent in the sensor is operated in a high light level environment. Additional coatings may be applied to the sensor surface to reduce the sensor's susceptibility to damage, but at an increase in the sensor to target electrode distance.

In U.S. Pat. No. 6,049,620 Dickinson et al. disclose a technique to measure the capacitance at each sensor electrode using a low value current source and additional active circuitry. A signal proportional to the capacitance is switched onto the array wiring which no longer degrades the capacitance sensor system sensitivity. The reference capacitance value is dominated by the sensor electrode capacitance and the capacitance of the circuitry connected to the sensor electrode itself.

In U.S. Pat. No. 6,097,195 Ackland et al. disclose a method to reduce the sensor electrode capacitance by introducing a shield electrode between the sensor electrode and the physical support structure at ground potential. This reference capacitance cancellation technique is applied individually to each sensor electrode, resulting in some reduction in the reference capacitance and a proportional increase in the sensor capacitance sensitivity. The amplifier used in the feedback circuit was a source follower whose gain was significantly less than unity. This resulted in incomplete reference capacitance cancellation, but required no additional circuitry and little additional power.

Other capacitive sensor systems have been described which add circuitry to the sensor array. In U.S. Pat. No. 6,114,862 Tartagni et al. disclose a capacitance sensor with active circuitry and special electrode configurations designed to improve the capacitive sensor sensitivity. This increase in sensor complexity increases the risk of damage to the sensor from various sources and degradation form others. The cost of the sensor system as and integrated circuit and its risk of damage are proportional to the sensor size, which is usually over 1 cm square for the nearly rectangular sensor arrays.

Rather than measuring the static position of the fingerprint artifacts, in U.S. Pat. No. 6,317,508 Kramer et al. disclose a capacitive sensor with a rectangular aspect ratio over 10:1. This sensor can measure capacitances and locations of fingerprint positions as the finger is moved over the sensor surface. Such asymmetrical arrays offer a cost advantage proportional to their integrated circuit size reduction. The asymmetry also reduces the effects of the array wiring in sensors disclosed by Knapp for wires along the narrow sensor direction.

While these known designs and methods present opportunities to improve the performance and reduce the cost of capacitive sensors, problems and limitations still remain, at least some of which are solved by the invention disclosed herein.

RELEVANT LITERATURE

| U.S. Pat. No. | Date | Inventor(s) | Class |
| --- | --- | --- | --- |
| 4,210,899 | July 1980 | Swonger, et al. | 340/146.3 E |
| 4,353,056 | October 1982 | Tsikos | 340/146.3 E |
| 4,429,413 | January 1984 | Edwards | 382/4 |
| 4,526,043 | July 1985 | Boie, et al. | 73/862.04 |
| 5,195145 | March 1993 | Backus, et al. | 382/4 |
| 5,325,442 | June 1994 | Knapp | 382/4 |
| 5,434,446 | July 1995 | Hilton, et al. | 257/503 |
| 5,778,089 | July 1998 | Borza | 382/124 |
| 5,828,773 | October 1998 | Setlak, et al. | 382/126 |
| 5,978,496 | November 1999 | Harkin | 382/124 |
| 6,049,620 | April 2000 | Dickinson, et al. | 382/124 |
| 6,055,324 | April 2000 | Fujieda | 382/124 |
| 6,061,464 | May 2000 | Leger | 382/124 |
| 6,097,195 | August 2000 | Ackland, et al. | 324/719 |
| 6,114,862 | September 2000 | Tartagni, et al. | 324/662 |

-continued

| U.S. Pat. No. | Date | Inventor(s) | Class |
|---|---|---|---|
| 6,289,114 | September 2001 | Mainguet | 324/124 |
| 6,317,508 | November 2001 | Kramer, et al. | 382/124 |
| 6,365,888 | April 2002 | Von Basse, et al. | 250/208.1 |

SUMMARY

The invention provides device, system, and method for a capacitive sensor that increases capacitance sensor sensitivity relative to known designs while reducing power consumption and increasing mechanical robustness in use. It also provides a lower cost sensor resulting at least in part from reductions in circuit size and the use of CMOS technology. Capacitance measurement utilizes a charge pump circuit, a particular type of switched capacitor, which is well suited to CMOS technology implementation. In the switched capacitor circuit, the sensor electrode is repeatedly charged and discharged to measure its associated capacitance.

In one aspect, background capacitance cancellation may be implemented, and when such background capacitance cancellation is used, the shield electrode is repeatedly charged and discharged relative to ground as the shield potential follows the sensor electrode. Background capacitance is also referred to as parasitic or reference level capacitance. To avoid this potential problem and the large transistors required to drive the shield electrode, the shield is segmented such that only the rows or columns of sensor electrodes being measured are experiencing background capacitance cancellation. To further reduce the power, active amplifiers for the cancellation are advantageously replaced with switches.

In another aspect, the rate at which capacitances can be measured is increased relative to conventional devices and methods by providing switch capacitance measurement circuitry to all array columns. One sensor element along each column may be addressed during any measurement period and simultaneous addressing of multiple rows of sensor cells is possible.

In another aspect, voltages or potentials other than the power supply voltage and ground voltage or potential, may alternatively be used and provide improved operation, but the cost in terms of power and circuit area may not be justified in some embodiments of the invention. Rather, the use of full power supply potential swing on the shield electrodes allows for the use of simpler shield electrode design. This full swing improves the capacitance background cancellation such that the array wire capacitances in asymmetrical arrays can be cancelled.

In another aspect, mechanical robustness and resistance to optically induced electrical currents are greatly increased in the invention by removing all MOS transistor components from the sensor electrode area.

In another aspect, the invention provides a capacitance sensor system including a semiconductor integrated circuit in which no MOS devices are beneath or between any sensor or shield electrodes, a plurality of sensor and shield electrodes, and a plurality of circuits.

In another aspect, the invention provides a capacitance sensor device including: a semiconductor integrated circuit, a plurality of sensor electrodes arranged as an array, a plurality of shield electrodes, a plurality of amplifier circuits, a plurality of charge pump circuits; and a plurality of switches that allows the connection amongst the circuits and the electrodes. In yet another aspect, this capacitive sensor device has no MOS devices within the integrated circuit area beneath or between any of the sensor electrodes or shield electrodes.

In another aspect, the invention provides a method of operating the capacitive sensor generally and a methods and procedures for operating component circuits to provide the desired operation and capacitance change, variation, or difference detection sensitivity.

In yet another aspect, the invention provides an information appliance (such as a computer, personal data assistant, or smart phone) or communication device (such as a mobile telephone) incorporating the inventive sensor for fingerprint sense based access, identification, and/or verification.

BRIEF DESCRIPTION OF THE DRAWINGS

For a more thorough understanding of the features and advantages of the inventive capacitive sensor and sensing method, reference is now made to the detailed description of the invention in which.

The figures are schematic and have not been drawn to any consistent scale. The same reference numbers are used throughout to represent the same or similar elements.

DETAILED DESCRIPTION OF EMBODIMENTS OF THE INVENTION

With reference to the conventional devices and methods described in the background, it will be appreciated that one object of the present invention to provide a capacitance sensor system that overcomes the shortcomings of the known technology. In one aspect, the present invention increases capacitance sensor sensitivity while reducing power consumption and increasing mechanical robustness in use. Cost reductions result from reductions in circuit size as well as the use of CMOS technology not modified for sensor or fingerprint applications.

The primary capacitance measurement technique is implemented as a charge pump circuit, a particular type of switched capacitor. Such circuits are well suited to CMOS (or other MOS) technology implementation. Unlike active circuits, circuits consume very little static power. However, their dynamic power can be significant if the capacitive loads or the operating frequencies are high.

In the switch capacitor circuit, the sensor electrode is repeatedly charged and discharged to measure its associated capacitance. If background capacitance cancellation is used, the shield electrode is repeatedly charged and discharged relative to ground as the shield potential follows the sensor electrode. Background capacitance is also referred to as parasitic or reference level capacitance. To avoid this potential problem and the large transistors required to drive the shield electrode, the shield is segmented such that only the rows or columns of sensor electrodes being measured are experiencing background capacitance cancellation. To further reduce the power, active amplifiers for the cancellation are replaced with switches.

To increase the rate at which capacitances can be measured, all columns contain switch capacitance measurement circuitry. One sensor element along each column may be addressed during any measurement period. Simultaneous addressing of multiple rows of sensor cells is possible.

Potentials other than the power supply voltage and ground might alternatively be used and provide improved operation, the cost in power in circuit area is not justified in this invention. Rather, the use of full power supply potential swing on the shield electrodes allows for the use of simpler shield electrode design. This full swing improves the capacitance background cancellation such that the array wire capacitances in asymmetrical arrays can be cancelled.

Mechanical robustness and resistance to optically induced currents are greatly increased in the invention by removing all MOS transistor components from the sensor electrode area. Embodiments in which some MOS transistor components remain in the sensor electrode area may be contemplated but are not preferred.

Additional aspects and features of various embodiments of the inventive device, system, and method are now described relative to the figures.

Figure 1:
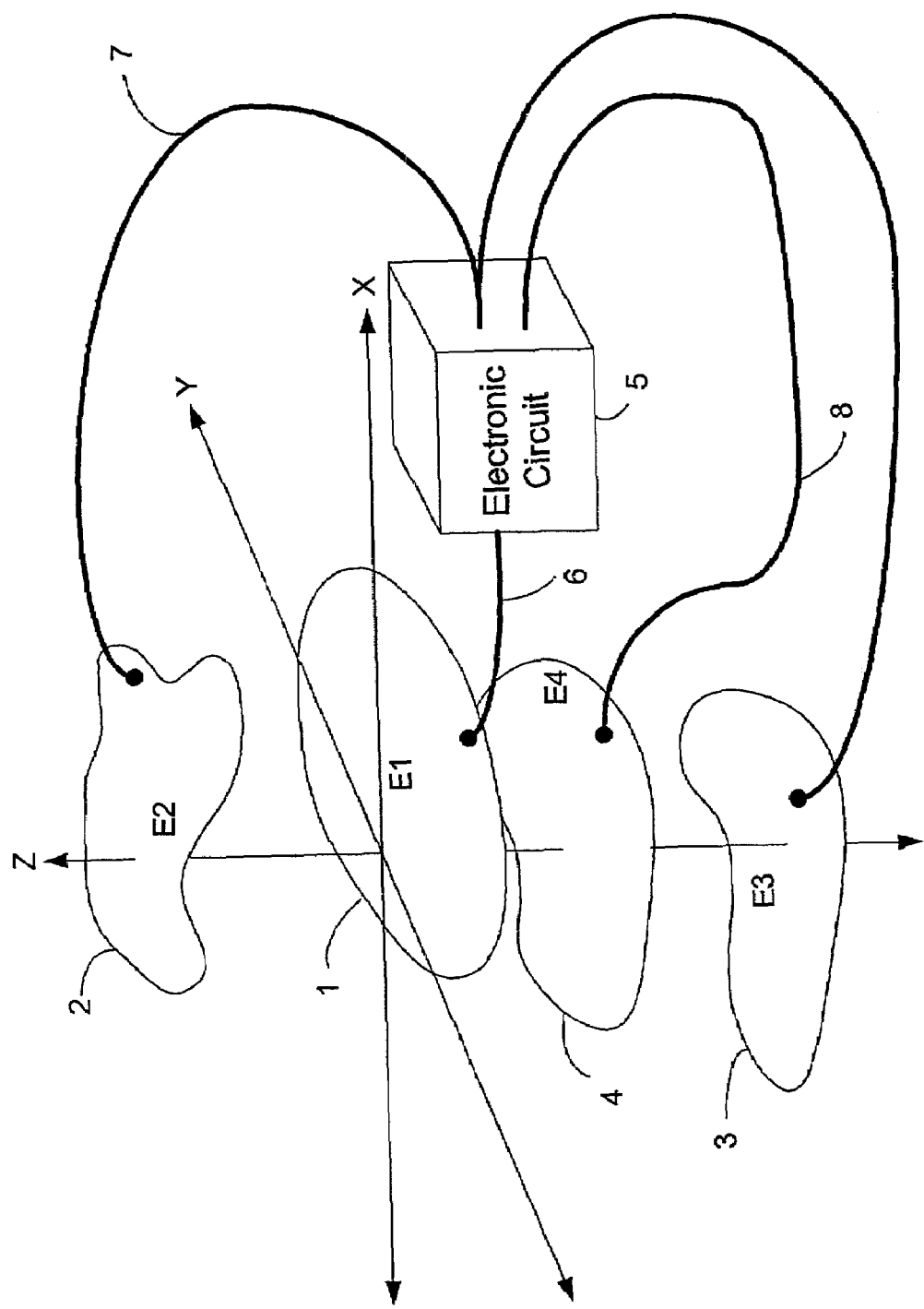
FIG. 1 illustrates a representative embodiment of a capacitive sensor system, including of physical electrodes and electronic circuits.

FIG. 1 shows an elementary part of an embodiment of a capacitive sensor system consisting of a single sense electrode E1 (1), a single shield electrode E4 (4), a single electronic circuit (5), and a reference electrode E3 (3). In this embodiment, the reference electrode (3) is shown at the same potential as the target electrode E2 (2), but the target electrode (2) need only be at any static potential relative to the reference electrode in a capacitive sensor. The electronic circuit (1) determines the capacitance between terminals (6) and (7) while applying an appropriate signal to terminal (8) and to shield electrode (4).

FIG. 1 further illustrates the feature of the invention as embodied in an integrated circuit. The electrodes (single sense electrode E1 (1), reference electrode E3 (3), and shield electrode E4 (4)) are primarily parallel to the integrated circuit surface shown in the X-Y plane. Sense electrode (1) is physically separated from the reference electrode (3) by the shield electrode (4). Shield electrode (4) is located beneath the sense electrode (1) as well as lateral to or minimally above a plane of the sense electrode (1), but not so far above sense electrode (1) as to appreciably decrease the capacitance value k12 between sense electrode (1) and the target electrode (2).

As illustrated in FIG. 1, a sense electrode E1 (1) is disposed in a layered structure in a first plane that is entirely offset from a second plane in which a reference electrode E3 (3) is disposed, and is entirely offset from a third plane in which at least one shield electrode E4 (4) is disposed. Furthermore, in the embodiment illustrated in FIG. 1, the different planes or layers are disposed in an order relative to the Cartesian coordinate system z-axis in the drawing as follows in order of increasing z-axis coordinate value: reference electrode E3 (3), shield electrode E4 (4), sensor electrode E1 (1), and when present a target electrode E2 (2).

The shielding provided by shield electrode E4 (4) is described by the values of the capacitance k13 between sense electrode E1 (1) and reference electrode E3 (3). If value k13 is zero, then the shielding between sense electrode E1 (1) and reference electrode E3 (3) is ideal. Physical realization of an ideal shield electrode (4) increases the size of shield electrode (4) which increases the capacitance value k34. The electronic circuit (5) is required to drive this increased capacitance during operation of the sensor system. In this embodiment, physical realization of a near ideal shield electrode (4) is not required.

Figure 2:
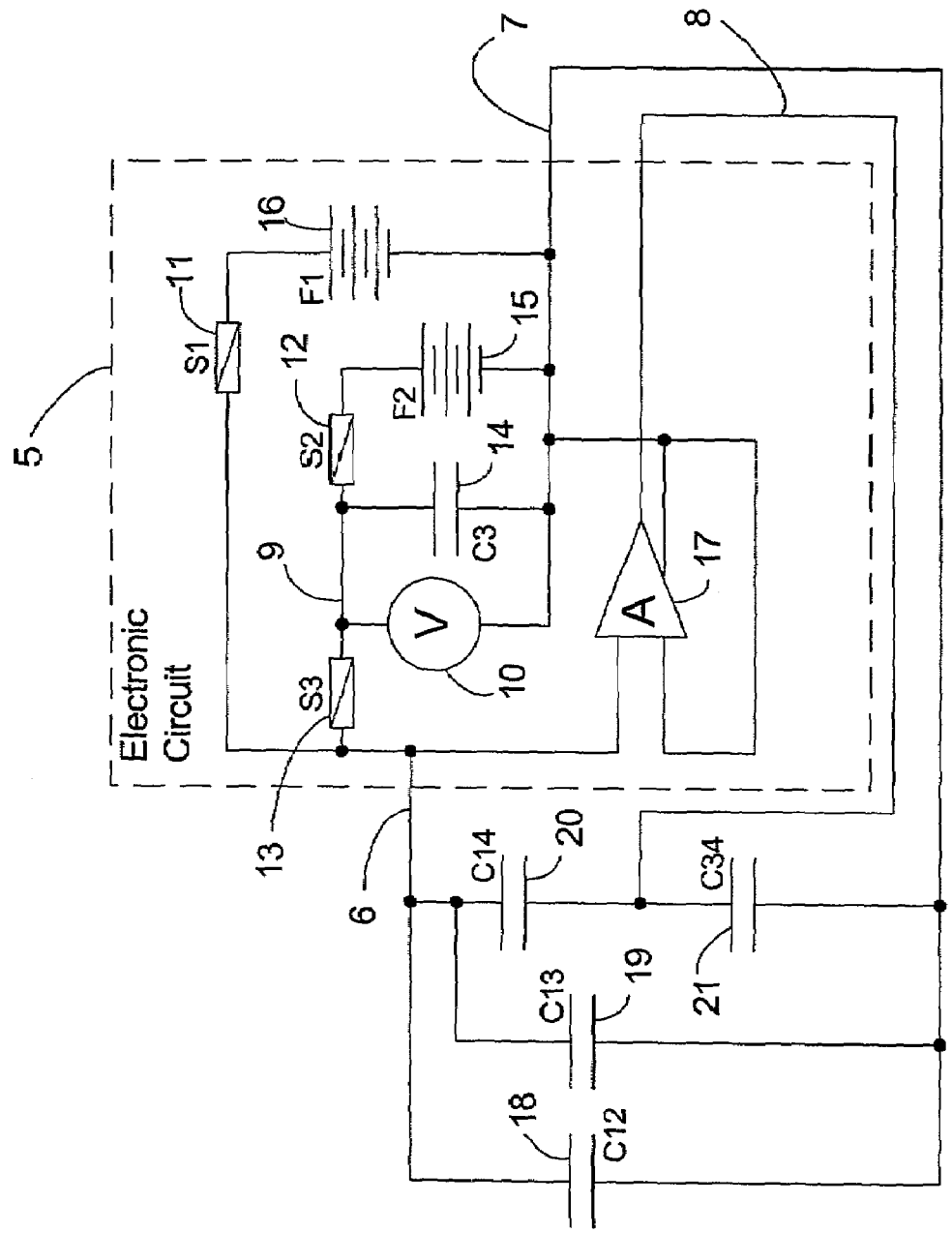
FIG. 2 is an embodiment of a charge-pump type electronic circuit for determining capacitance between electrical nodes.

FIG. 2 shows the schematic representation of the elementary physical and circuitry design of the embodiment illustrated and described relative to FIG. 1. The capacitor and capacitance C14 (20) of value k14 is measured between sense electrode E1 (1) and shield electrode E4 (4). Capacitors C34 (21), C13 (19) and C12 (18) with respective value k34, k13, and k12 are illustrated in FIG. 2. Electronic circuit (5) measures the capacitance between nodes 6 and 7 using three switches, S1 (11), S2 (12), and S3 (13); a known capacitance C3 (14) of value k3, two fixed voltage sources F1 (16) and F2 (17) of potential v1 and v2; a potential measuring device V (10), such as a voltage analog to digital converter; and a non-inverting amplifier A (17) with voltage gain g.

Aspects of the method of operating an embodiment of the inventive sensor are now described. Considering first the case for which gain g equals zero, node (8) is at a fixed potential (7). This circuit functions in a sequence of discrete time intervals to determine the value (k12+k13+k14) associated with capacitors C12 (18), C13 (19), and C14 (20). The first time interval in the measurement sequence is called the pre-charge interval. Switches S1 (11) and S2 (12) are closed and switch S3 (13) is open. Capacitors (18), (19), and (20) are charged to potential v1 by source (16). Also, capacitor (14) is charged to potential v2 by source (15). During the next interval, called the open interval, all switches S1 (11), S2 (12), and S3 (13) are open. The next interval is called the evaluate interval in which switches S1 (11) and S2 (12) are open and switch S3 (13) is closed. The charge deposited on capacitors (18), (19), and (20) is said to have been "pumped" to capacitor (14). Voltmeter V measures the potential v between nodes (7) and (9) across capacitor (14). The capacitance value (k12+k13+k14) is equal to the value $k3 \cdot ((v2/v)-1)/(1-(v1/v))$ such that v1 is not equal to v2. In this embodiment of the invention, either of v1 or v2 is set equal to zero without loss of generality. Setting v2 equal zero simplifies the following explanation.

The capacitance value (k12+k13+k4), defined as equal to ksum, can be determined after the first evaluate interval. However, if capacitance ksum is much less than capacitance k3, potential v is nearly equal to zero. The measurement sequence may be continued by returning to the open interval and then entering a new interval called the charge interval. In the charge interval, switch S1 (11) is closed which increases the potential at node (6) to v1. The measurement sequence again enters the open interval followed by the evaluate interval to complete the second pump cycle. Voltmeter (10) now indicates a different potential or voltage v. Again the value ksum can be determined from k3 and voltage v.

It is more useful to evaluate the voltage v in terms of the capacitance values k12, k13, and k14 as the purpose of the capacitive sensor system is to measure capacitance k12 to determine the absence or presence of electrode E2 (2). After the first evaluate interval, the voltage ration v/v1 equals (ksum)/(ksum+k3). For the situation in which capacitance k3 is much larger than capacitance ksum, after the second evaluate interval, the voltage ration v/v1 approximately equals 2·(ksum)/(ksum+k3). The capacitor C3 (14) is pumped up by charge deposited in the capacitors C12 (18), C13 (19), and C14 (20) by source F1 (16). After some number N of such charge and evaluate cycles of the switches S1 (11), S2 (12) and S3 (13), the voltage ration v/v1 approximately equals N·(ksum)/(ksum+k3) for the case v/v1 less than about 0.2.

An evaluation of the circuit output v to changes in capacitance value k12 can be made starting from a capacitance k12 value equal 0. This initial case represents target electrode E2 (2) absent from FIG. 1. It can be shown that the most sensitive operating point for measuring capacitance k12 occurs when both capacitors C13 (19) and C14 (20) have zero value. However, it can also be shown that this solution is overly restrictive so that this condition is not required. As is embodied in this invention, the condition that a zero value of net charge flow into node (6) from capacitors C13 (19) and C14 (20) is sufficient to operate the capacitive sensor system at its most sensitive operating point. Additionally as embodied in the invention a non-zero value of capacitance k13 is implemented.

Evaluation of the electronic circuit (5) with an amplifier A (17) with non-zero gain g shows that for a value of gain g equal to $1/(1+(k13/k14))$, there is no net charge flow into node (6) from capacitors C13 (19) and C14 (20). For capacitance k13 equal to zero, the value of gain g equals one. During the cyclic pumping operation of electronic circuit (5), amplifier A (17) drives node (8) between voltage v1 and voltmeter (10) voltage v, which starts at zero. The combination of capacitors C13 (19) and C14 (20) with amplifier A (17) maintains the net charge flow into node (6) on a cycle-by-cycle basis. However, to maintain net charge flow into node (6), the detailed signal at node (8) is less important than the swing at node (8) during each measurement cycle.

Figure 3:
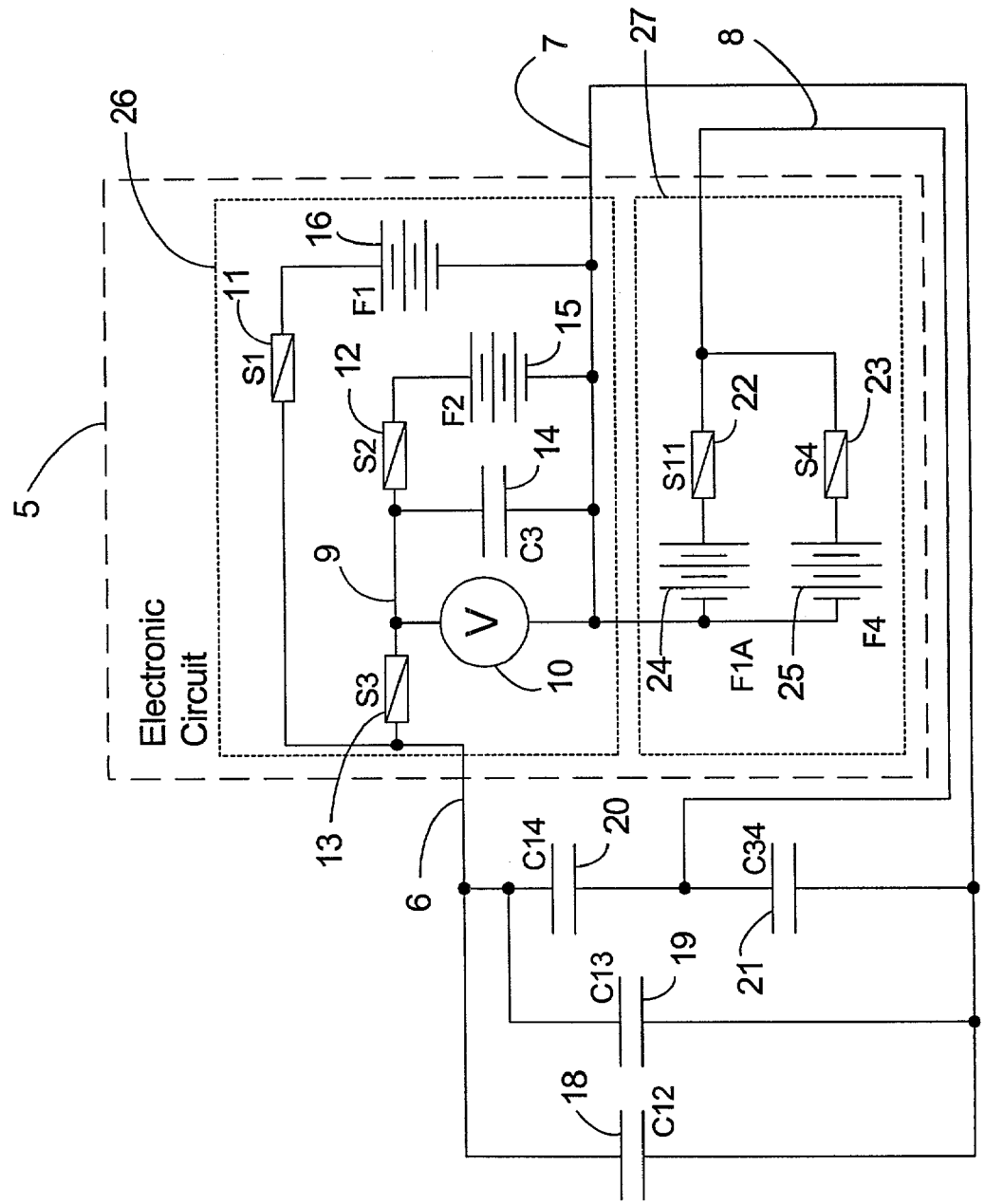
FIG. 3 is an embodiment of a charge-pump type electronic circuit with improved power efficiency.

FIG. 3 shows another embodiment of the invention, specifically the amplifier A (17) is replaced by switches S11 (22) and S4 (23); and fixed voltage sources F1A (24) of potential v1a and F4 (25) of potential v4. The electronic circuit (5) is further divided into a charge pump circuit (26) and a switch cancellation circuit (27). Switch S11 (22) opens and closes synchronously with switch S1 (11). Switch S4 (23) opens and closes synchronously with switch S3 (13). By adjusting the values of v1a and v4 for a given number of cycles for a particular set of values k13 and k14, the net charge flow into node (6) averaged over the entire N measurement cycles can be set to zero. In this manner, the capacitance sensor system can operate at its most sensitive operating point.

A further simplification of electronic circuit (5) is made in another embodiment of the invention. In this embodiment, all the voltage sources are set to a value of the prime power of the system, Vcc or the reference potential value, such as 0 volts. There are two electrically equivalent solutions: Vcc=v1, via and 0=v2, v4; or 0=v1, v1a and Vcc=v2, v4. As embodied in embodiments of the invention, these solutions require that k13 and k14 be appropriately chose in the physical design, particularly in the design of the shield electrode, so as to insure approximately zero net charge flow into node (6).

Figure 4:
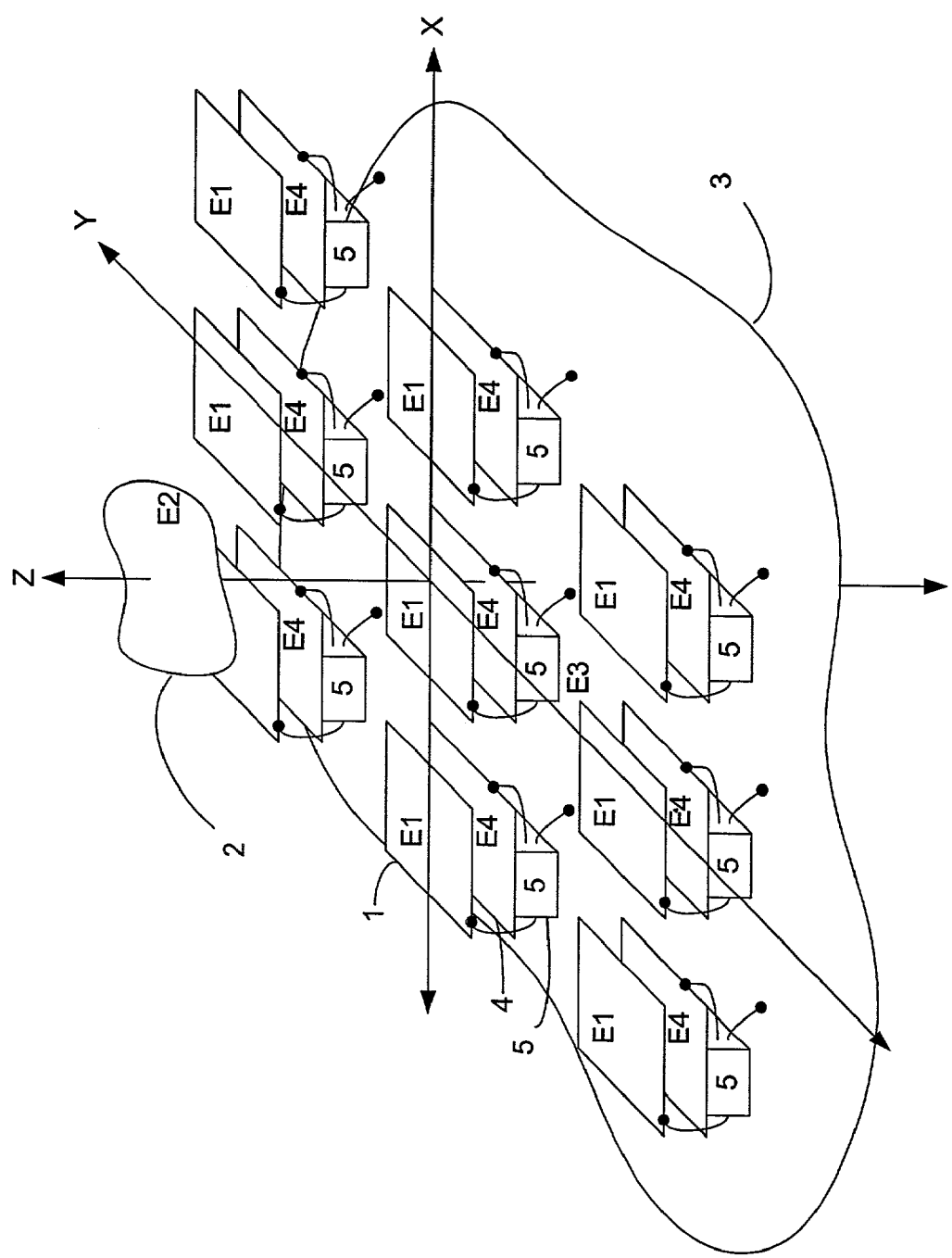
FIG. 4 is a schematic representation of a portion of an embodiment of a capacitive sensor array using the localized reference capacitance cancellation.

With respect to the embodiment of the invention in FIG. 1, the presence of electrode E2 (2) can be detected by measuring the capacitance value k12 between target electrode E2 (2) and sense electrode E1 (1). In order to use the capacitance measurement to locate the position of target electrode E2 (2) above the X-Y plane containing sense electrode E1 (1), this embodiment of the invention adds additional electrodes adjacent to E1 (1) in the X-Y plane to form an array. Additional electrodes are desirably added adjacent to shield electrode E4 (4) as well as additional electronic circuits (5). FIG. 4 shows a sample 3×3 element, X-Y array of identical sense electrodes E1 (1), above identical shield electrodes E4 (4), and identical electronic circuits (5) suitable for construction as an integrated circuit. The wiring associated with connecting and addressing such an array of individual circuits is known in the art and not shown to avoid obscuring the other structures.

As illustrated in FIG. 4, at least one sense electrode E1 (1) is disposed in a layered structure in a first plane that is entirely offset from a second plane in which at least one of an at least one reference electrode E3 (3) is disposed, and is entirely offset from a third plane in which a shield electrode E4 (4) is disposed. Furthermore, in the embodiment illustrated in FIG. 1, the different planes or layers are disposed in an order relative to the Cartesian coordinate system z-axis in the drawing as follows in order of increasing z-axis coordinate value: reference electrode E3 (3), a plurality of shield electrodes E4 (4), a plurality of sensor electrodes E1 (1), and when present a target electrode E2 (2). In the embodiment of FIG. 4, an electronic circuit (5) is illustrated for each pair of sense electrode E1 (1) and shield electrodes E4 (4) in a layer separate from but between the layers of the reference electrode E3 (3) and the shield electrodes E4 (4).

In practice, array sizes larger than 3×3 are used, but these larger arrays use the same principles of operation as a 3×3 array which will illustrate the principles embodied in the invention. There is one electrically common electrode E3 (3) at the reference potential. Only one target electrode E2 (2) at an unknown static potential is illustrated, but more than one electrode can be simultaneously sensed by the described capacitive sensor system. While the construction of a system with an X-Y array of electrodes E1 (1) and E4 (4) is practical, an array of electronic circuits (5) is more difficult and required additional circuit area and adds complexity to the entire capacitance sensor system.

Figure 5:
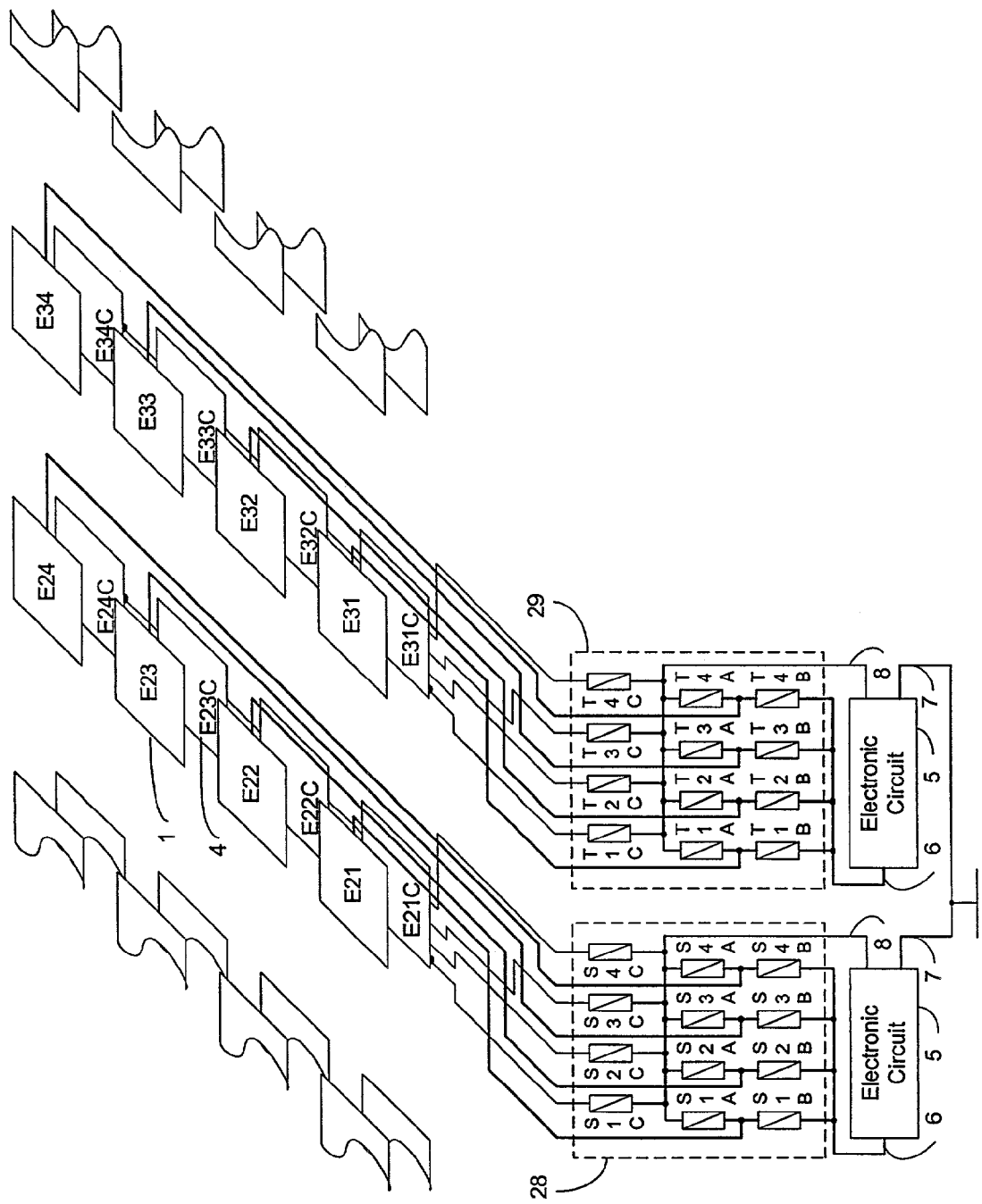
FIG. 5 is an embodiment of a portion of a capacitive sensor system using a switch matrix physically external to the sensor area.

The sharing of the electronic circuits (5) by several electrode E1 (1) and E4 (4) pairs reduces the complexity of the X-Y array capacitive sensor system. As an illustration of another embodiment, FIG. 5 illustrates the detailed connections required to implement the center two columns of an example of a 4×4 array. For clarity, only two switch matrixes (28) and (29) are shown. Because of the deleterious effects of the wire length connecting electrodes (1) and (4) to the switches (28) and circuits (5), the embodiment is preferential advantageous to X-Y arrays in which the array length in the Y direction is reduced.

In the second column, E21 is a sense electrode connected by a wire to the common point between switches S1A and S1B. E24 is a sense electrode connected by a wire to the common point between switches S4A and S4B. Shield electrode E21C is connected by a wire to switch S1C and shield electrode E24C is connected by a wire to switch S4C. In the third column, E31 is a sense electrode connected by a wire to the common point between switches T1A and T1B. E34 is a sense electrode connected by a wire to the common point between switches T4A and T4B. Shield electrode E31C is connected by a wire to switch T1C and shield electrode E34C is connected by a wire to switch T4C.

By appropriately closing the switches S1B to S4B, one of the sensor electrodes E21 to E24 is connected to node (6) of circuit (5). By appropriately closing one or more switches S1A to S4A or S1C to S4C (28), the selected electrodes E21 to E24 and/or E21C to E24C become the shield electrode(s) connected to node (8). By suitable selection of the shield elements, capacitance values k13 and k14 as seen by electronic circuit (5) can be changed and the capacitance sensor operation improved and desirably optimized. The same type of configuration of the T switches (29) allows the third column to select a sense electrode and connect it to node (6) and-or one or more shield electrodes and connect it (them) to node (8). As the switch matrixes (28) and (29) are electronic, they can be switched rapidly so that the position of many target electrodes E2 (2) may be located above the X-Y plane of sense electrode (1).

Figure 6:
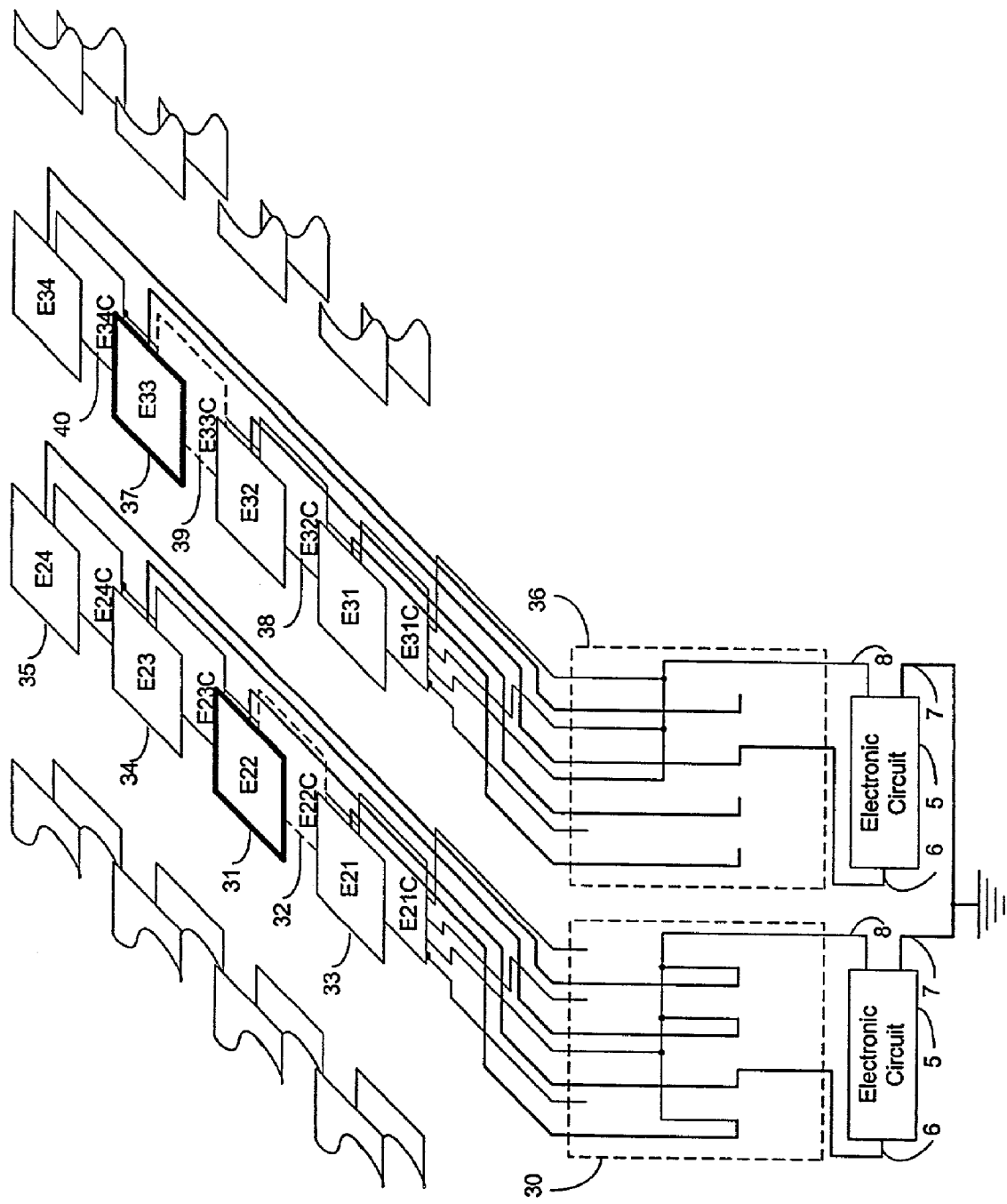
FIG. 6 illustrates two switch matrix configurations for the capacitive array sensor of the embodiment illustrated in FIG. 5.

FIG. 6 further illustrates specific features of the switch closures (30) and (36) used in an embodiment of the invention. Sensor electrode E22 (31) is connected to node (6). Shield electrode E22C (32) is connected to node (8). Similarly sense electrodes E21 (33), E23 (34), and E24 (35) are connected to node (8) and act as shield electrodes. Also, sensor electrode E33 (37) is connected to node (6). E33C (39), E34C (40), and E32C (38) are connected to node (8). The other sensor electrodes in the column are not connected.

Figure 7:
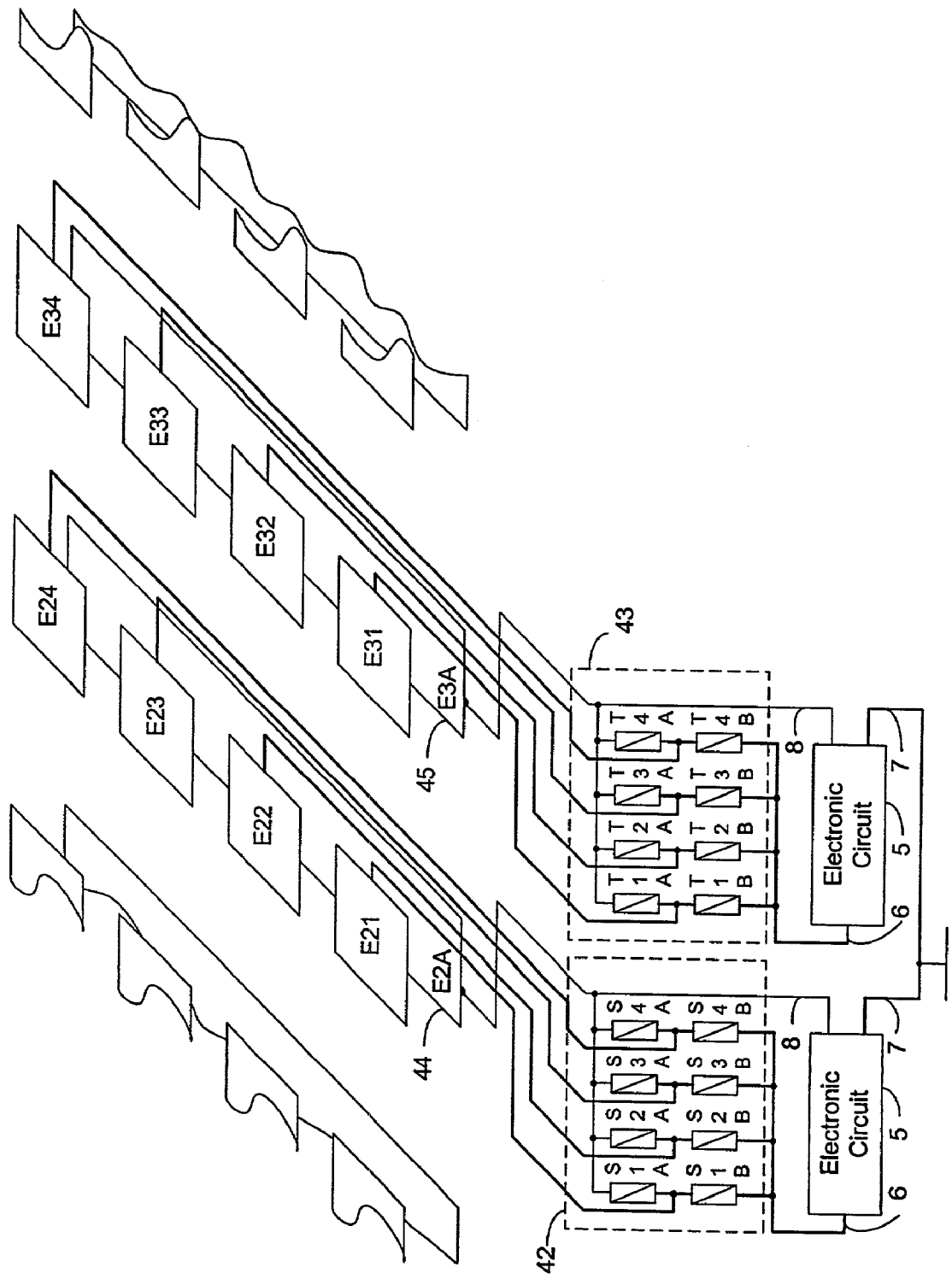
FIG. 7 is an embodiment of a portion of the capacitive sensor system using a column-shared reference capacitance cancellation.

Connection of all the shield electrodes (44) and (45) within a column embodies another aspect of the invention as shown in the embodiment of FIG. 7. Switch matrixes (42) and (43) have two thirds the elements compared as compared to the number in the FIG. 5 and FIG. 6 embodiment. The amount of wiring parallel to each column is reduced by half as compared to the FIG. 5 and FIG. 6 embodiment. For the second column there is only one shield electrode E2A (44), which is connected to node (8). For the third column there is only one shield electrode E3A (45), which is connected to node (8).

Figure 8:
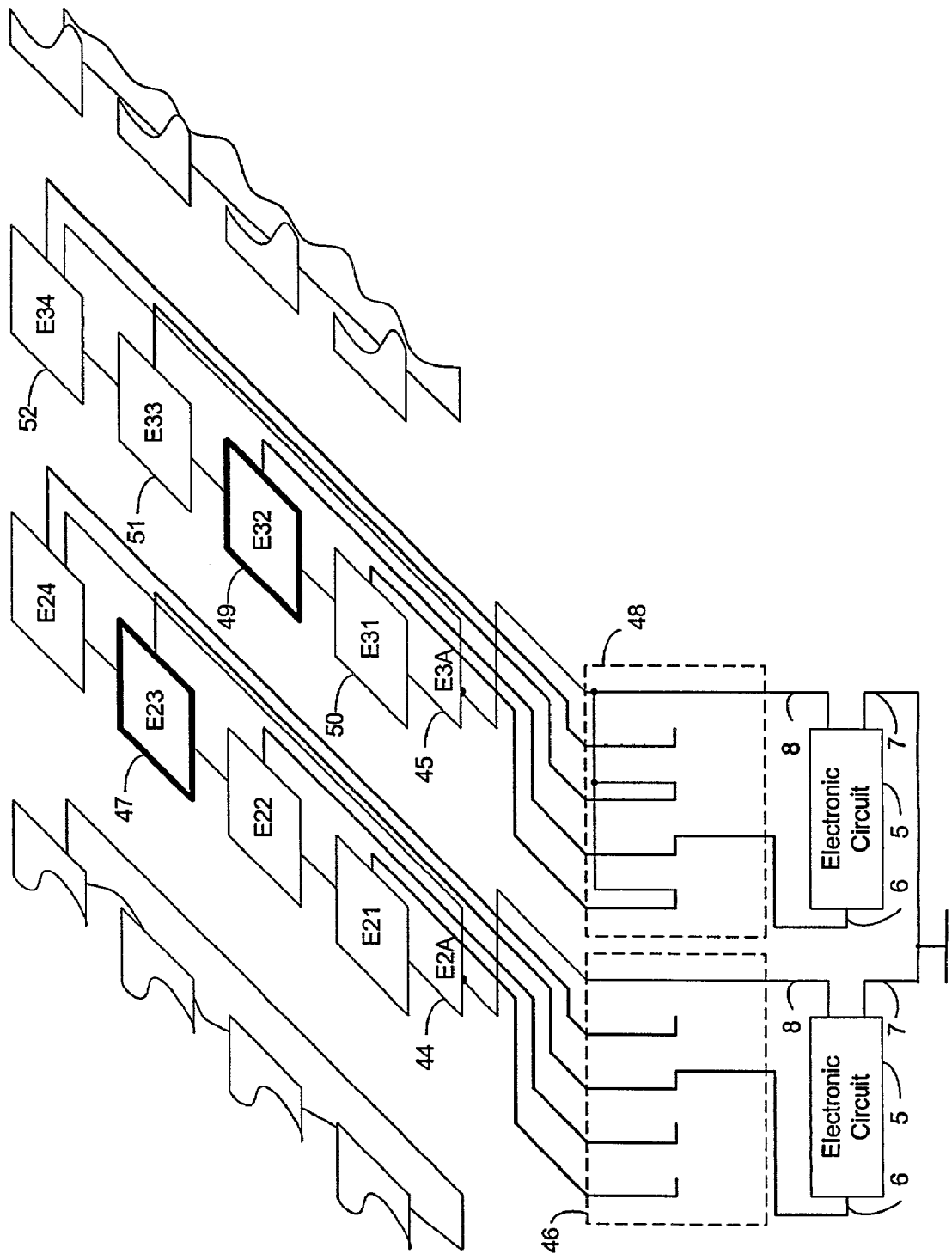
FIG. 8 illustrates two switch matrix configurations for the capacitive array sensor of the embodiment illustrated in FIG. 7.

FIG. 8 illustrates specific switch closures (46) and (48) generally described relative to the embodiment in FIG. 7. In the second column sensor electrode E23 (47) is connected to node (6). All other electrodes in the second column are unconnected. In the third column, sensor electrode E32 (47) is connected to node (6). E31 (50) and E33 (51) are also connected to (8) and act as shield electrodes.

FIGS. 5-8 show a common feature of embodiment, specifically that all the switch elements (28), (29), (30), (36), (42), (43), (46), and (48) as well as electronic circuits (5) are physically located outside the sensor electrode array (1). The sensor array area is defined here as the area of the integrated circuit in the X-Y plane that is under in between sensor electrodes (1). Another common feature or embodiment illustrated in FIGS. 5-8 is that each column is individually addressed. Sense electrodes (1) from different rows may be simultaneously addressed. All columns may simultaneously measure one sensor electrode (1) per row. However, the power required from the electronic circuit (5) through the wire (8) to simultaneously drive all shield electrodes as in FIG. 7 and FIG. 8 is significant owing to the close proximity of reference electrode (3) and shield electrode (4).

Figure 9:
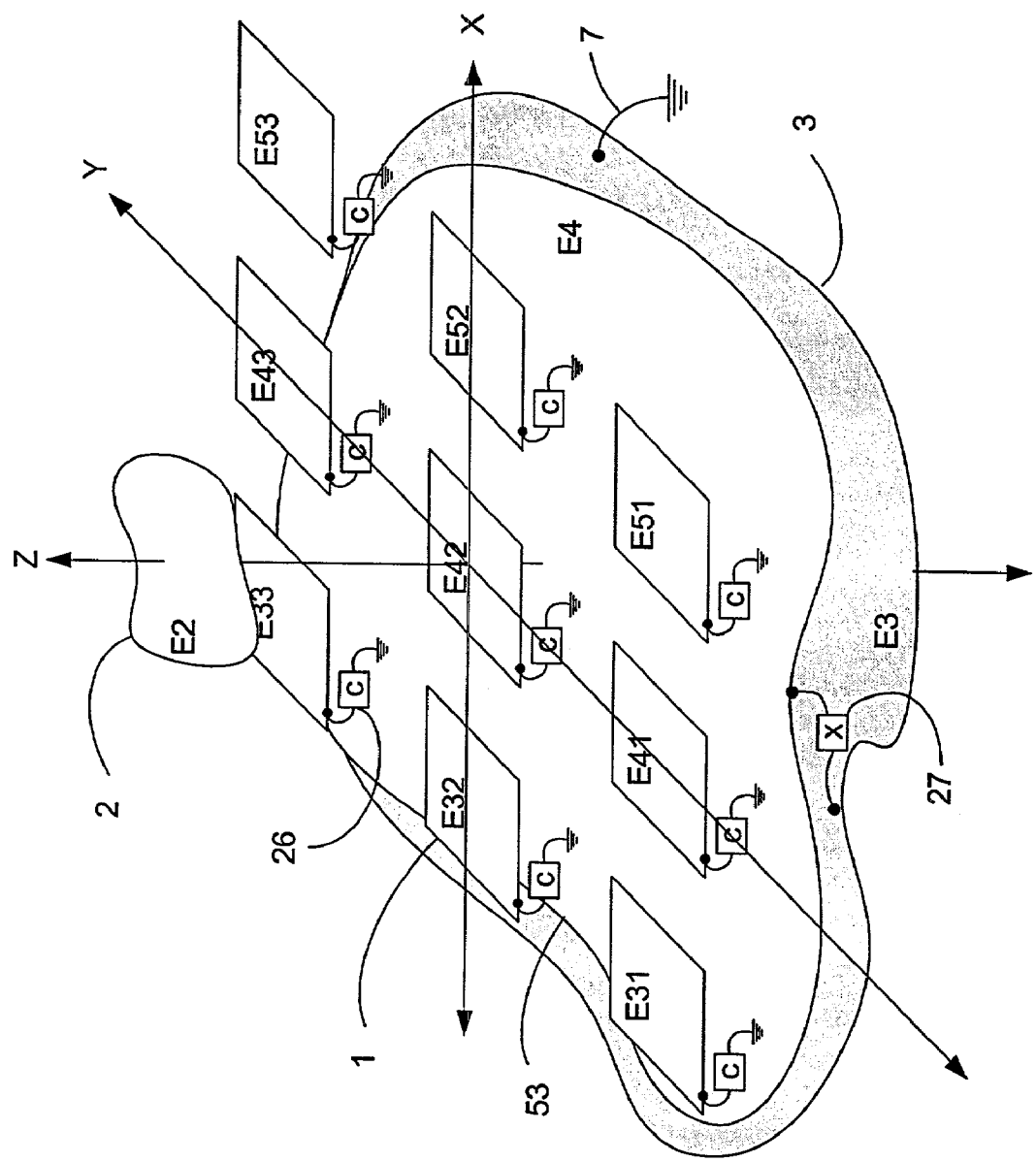
FIG. 9 is an embodiment of a portion of a capacitive sensor system using array-shared reference capacitance cancellation.

FIG. 9 depicts an embodiment of a configuration in which all shield electrodes (53) are common and driven by one switch cancellation circuit (27). For a 5 mm×5 mm square shield electrode (53) separated by 1 micrometer of silicon dioxide from a reference electrode (3) such as the integrated circuit substrate, the capacitance between shield electrode (53) and reference electrode (3) is approximately 900 picofarads. This capacitance can be reduced significantly by grouping the sense electrodes along rows rather than columns.

Figure 10:
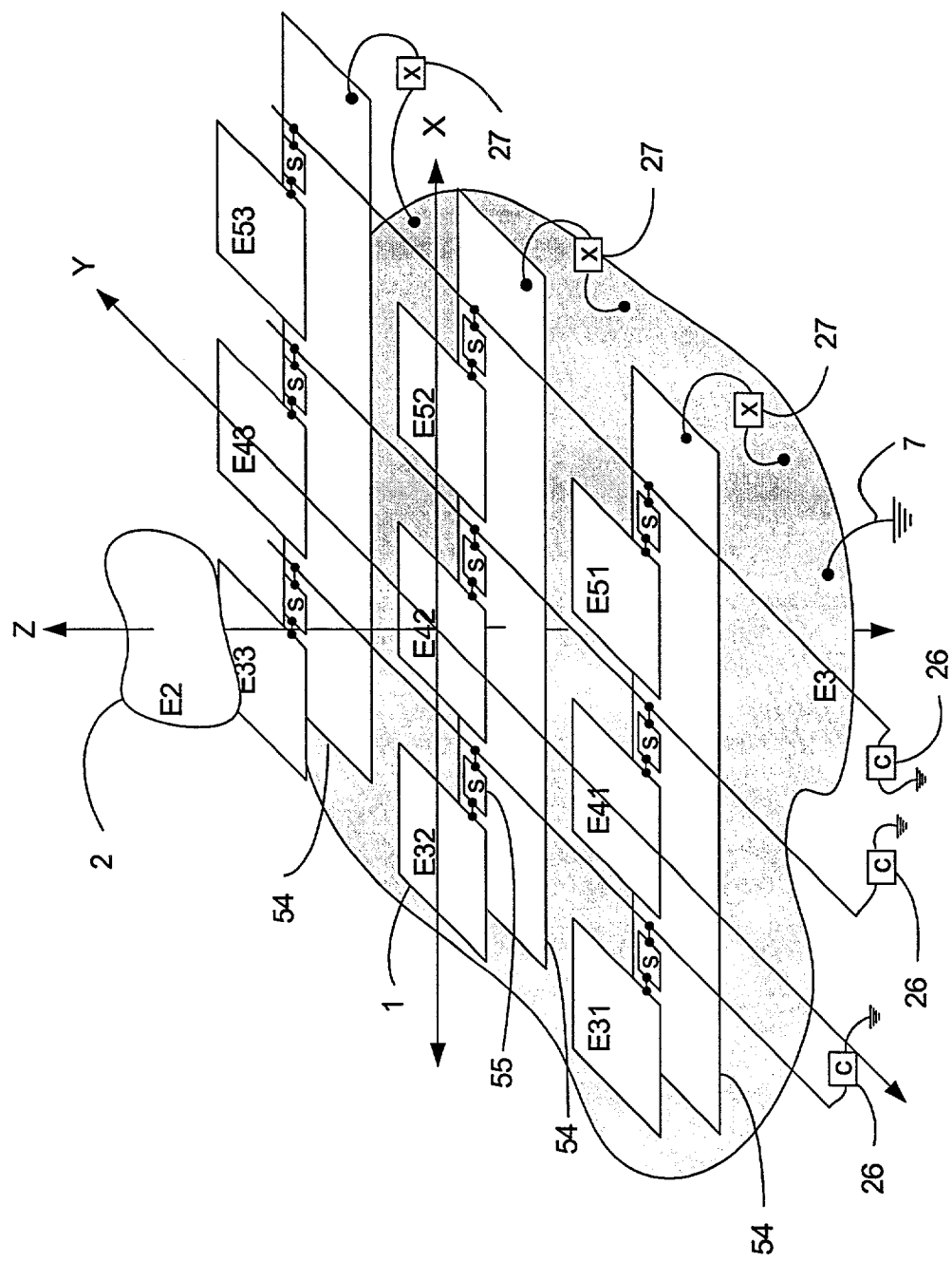
FIG. 10 is an embodiment of a portion of a capacitive sensor system using row-shared reference cancellation.

FIG. 10. shows an embodiment this alternative structure and method for configuring the shield electrodes (54) and their respective switch cancellation circuits (27). The shield circuits (27) remain at the edge of the array as in FIGS. 5-8. A reduction in the number of charge pump circuits (26) may be accomplished by adding switches (55) to each sense electrode (21). The switches allow for the sense electrodes (1) to be connected to charge pump circuits (26) at the edge of the array. Because the wires that connect the switches (55) are orthogonal to the rows of shield electrodes (54), the individual capacitances of the sensor electrodes (1) above the shield electrodes (54) may be measured simultaneously. Operation of switch cancellation circuits (27) in adjacent rows improves the shielding, but at the expense of additional power in the switch cancellation circuits (27).

Figure 11:
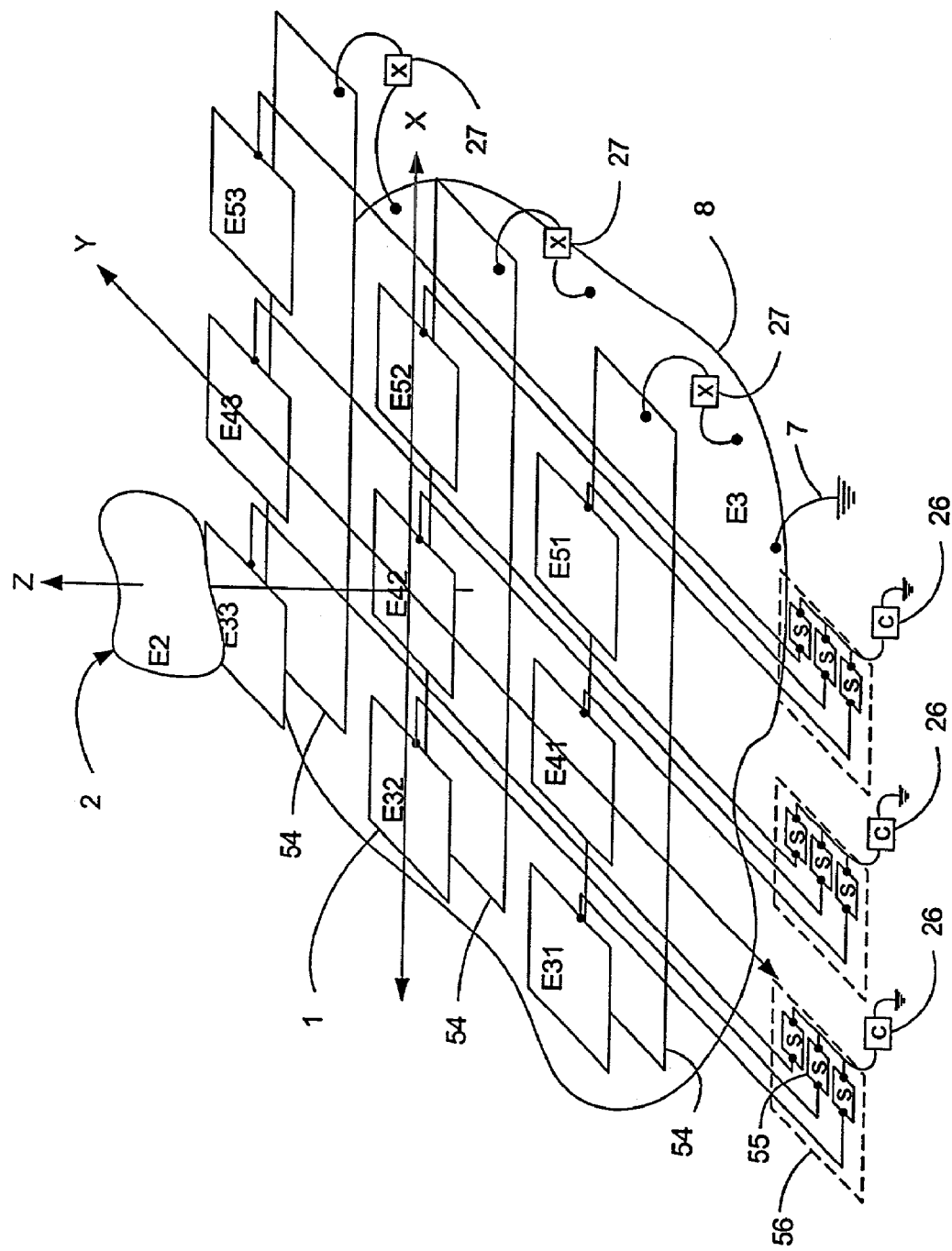
FIG. 11 is an embodiment of a portion of a capacitive sensor system using row-shared reference cancellation and column switch matrixes external to the sensor array.

To improve the mechanical robustness of the sensor, another embodiment of the sensor is shown in FIG. 11 that differs from FIG. 10 only in that the switches (55) are physically moved outside the sense electrode array area and grouped locally as a switch region (56). As with the capacitive sensor systems described in FIGS. 5-8, wires are added between the sense electrodes (1) to carry the signals from the sense electrodes (1) to the respective switches (55) devices. Because of the deleterious effects of the wire length connecting electrodes (1) and to the switches (55), the embodiment is preferential advantageous to X-Y arrays in which the array length in the Y direction is reduced.

It will be appreciated that the inventive sensor may be used separately or incorporated into a variety of other devices or systems. For example, the inventive sensor and sensing method may be used with and therefore provides an information appliance (such as a computer, personal data assistant, or smart phone) or communication device (such as a mobile telephone or other information appliance having communication capabilities) incorporating the inventive sensor for fingerprint sense based access, identification, and/or verification. In one embodiment, the invention provides a capacitive sensor based fingerprint swipe sensor integrated or otherwise attached to the surface of a wireless smart communication device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A capacitance sensor device comprising:
   a semiconductor integrated circuit;
   a sensor electrode array arranged in a two dimensional array of n rows and m columns;
   a shield electrode array arranged in a one dimensional array of n rows;
   a quantity of m charge pump circuits;
   a quantity of n switched level drivers with output levels of Vcc and 0, and when addressed, switching synchronous to the charge pump circuits, and with outputs connected to each of the n shield electrodes; and
   a quantity of m blocks of n switches that allows the connection of one of the n sensor electrodes along a column to a charge pump circuit.

2. The capacitance sensor device in claim 1, wherein no MOS devices within the integrated circuit are beneath or between any sensor or shield electrodes.

3. A capacitance sensor device according to claim 1, wherein the shield electrode array comprises a plurality of shield electrodes and the sensor electrode array comprises a plurality of sensor electrodes, and each of the plurality of shield electrodes separates at least one of the sensor electrodes from at least one reference electrode.

4. A capacitance sensor device according to claim 1, wherein said shield electrode array is an ungrounded shield electrode array.

5. A capacitance sensor device according to claim 1, wherein each charge pump circuit is operable to charge and discharge at least one of said shield electrodes relative to ground.

6. A capacitance sensor system comprising:
   a semiconductor integrated circuit in which no transistor devices are beneath or between any sensor or shield electrodes;
   a plurality of sensor and shield electrodes;
   at least one reference electrode;
   a plurality of circuits; wherein
   at least one of the plurality of shield electrodes separates at least one of the plurality of sensor electrodes from at least one reference electrode; and
   at least one of the plurality of sensor electrodes is disposed in a layered structure in a first plane that is entirely offset from a second plane in which at least one of the at least one reference electrode is disposed and is entirely offset from a third plane in which at least one of the plurality shield electrodes is disposed.

7. A capacitance sensor device comprising:
   a semiconductor integrated circuit;
   a plurality of sensor electrodes arranged as an array;
   a plurality of shield electrodes;
   a plurality of amplifier circuits;
   a plurality of charge pump circuits; and
   a plurality of switches that allows the connection amongst the circuits and the electrodes; wherein
   at least one of the plurality of sensor electrodes is disposed in a layered structure in a first plane that is entirely offset from a second plane in which at least one of the at least one reference electrode is disposed and is entirely offset from a third plane in which at least one of the plurality shield electrodes is disposed.

8. The sensor in claim 7, wherein no MOS devices within the integrated circuit are beneath or between any sensor or shield electrodes.

9. A capacitive sensor for detecting capacitive variations associated with physical contact between a finger and a surface of the sensor, the capacitive sensor characterized in that:
   all electronic circuits other than electrodes are located physically outside an area associated with physical contact by the finger at which are disposed a plurality of sensor electrodes; and
   at least one shield electrode separates at least one of the plurality of sensor electrodes from at least one reference electrode; wherein
   at least one sense electrode is disposed in a layered structure in a first plane that is entirely offset from a second plane in which at least one of the at least one reference electrode is disposed and is entirely offset from a third plane in which the at least one shield electrode is disposed.

10. The capacitive sensor of claim 9, further characterized in that the electronic circuits are all active circuits.

11. The capacitive sensor of claim 9, further characterized in that the electronic circuits are all transistor circuits.

12. The capacitive sensor of claim 9, further characterized in that the capacitive sensor includes a plurality of rows and columns and each of the columns is individually addressable.

13. The capacitive sensor of claim 12, further characterized in that sense electrodes from different rows simultaneously addressable.

14. The capacitive sensor of claim 9, further characterized in that the capacitive sensor is a fingerprint swipe sensor in which the tip of a finger is moved relative to the sensor and in physical contact with a surface of the sensor.

15. The capacitive sensor of claim 9, further characterized in that a charge-pump electronic circuit is used for determining capacitance between electrical nodes of the sensor.

16. The capacitive sensor of claim 9, further characterized in that localized reference capacitance cancellation is used.

17. A communication device comprising the capacitance sensor of claim 16.

18. The capacitive sensor of claim 9, further characterized in that a switch matrix physically external to the sensor area is used.

19. The capacitive sensor of claim 9, further characterized in that a column-shared reference capacitance cancellation is used.

20. The capacitive sensor of claim 9, further characterized in that an array-shared reference capacitance cancellation is used.

21. The capacitive sensor of claim 9, further characterized in that a row-shared reference cancellation is used.

22. The capacitive sensor of claim 9, further characterized in that a row-shared reference cancellation and column switch matrixes external to the sensor array are used.

23. A method of operating a capacitive sensor to capture at least a portion of a fingerprint, the method comprising:
   measuring capacitance at a plurality of sense electrodes, no transistor devices being located between or beneath any of the sense electrodes, at least one shield electrode separating at least one of the plurality of sensor electrodes from at least one reference electrode; and
   reconstructing at least a portion of a fingerprint, based at least in part on the measured capacitance; wherein
   the measured capacitance is measured with at least one sense electrode disposed in a layered structure in a first plane that is entirely offset from a third plane in which at least one of the at least one shield electrode is disposed and is entirely offset from a second plane in which at least one reference electrode is disposed.

24. A method according to claim 23, wherein the measuring comprises using localized reference capacitance cancellation.

25. A method according to claim 24, wherein said reference capacitance cancellation comprises charging and discharging at least one of said shield electrodes relative to ground.

26. A method according to claim 23, wherein the measuring comprises using column-shared reference capacitance cancellation.

27. A method according to claim 23, wherein the measuring comprises using array-shared reference capacitance cancellation is used.

28. A method according to claim 23, wherein the measuring comprises using row-shared reference cancellation is used.

29. A capacitance sensor system comprising:
a semiconductor integrated circuit in which no transistor devices are beneath or between any sensor or shield electrodes;
a plurality of sensor and shield electrodes;
a plurality of circuits;
a plurality of switches that allows the connection amongst the plurality of circuits and the plurality of sensor and shield electrodes; and
at least one reference electrode, wherein each of said plurality of shield electrodes is placed beneath at least one of the plurality of sensor electrodes to separate the at least one of the plurality of sensor electrodes from at least one reference electrode.

30. A capacitance sensor device comprising:
a semiconductor integrated circuit;
a plurality of sensor electrodes arranged as an array;
a plurality of shield electrodes;
a plurality of amplifier circuits;
a plurality of charge pump circuits;
a plurality of switches that allows the connection amongst the circuits and the electrodes; and
at least one reference electrode, wherein each of said plurality of shield electrodes is placed beneath at least one of the plurality of sensor electrodes to separate the at least one of the plurality of sensor electrodes from at least one reference electrode.

31. A capacitance sensor for detecting capacitive variations associated with physical contact between a finger and a surface of the sensor, the capacitive sensor characterized in that:
all electronic circuits other than a sense and a shield electrode are located physically outside an area associated with physical contact by the finger at which are disposed a plurality of sensor electrodes, further comprising at least one reference electrode wherein the shield electrode is placed beneath the sensor electrode to separate the sensor electrode from at least one reference electrode.

32. A capacitive sensor comprising:
a switched capacitor circuit;
a sensor electrode connected to the switched capacitor circuit such that the switched capacitor circuit is configured to charge and discharge the sensor electrode; and
a shield electrode connected to the switched capacitor circuit and placed beneath the sensor electrode to separate the sensor electrode from a reference electrode.

33. A capacitive sensor according to claim 32 wherein the sensor electrode, shield electrode, and switched capacitor circuit are configured to provide reference capacitance cancellation.

34. A method of operating a capacitive sensor to capture at least a portion of a fingerprint, the method comprising:
placing all transistor components outside a capacitive sensor sense elements area to reduce generation of optically induced electrical currents in the area;
measuring capacitance at a plurality of sense electrodes based at least in part on the measured capacitance and reference capacitance cancellation using at least one reference electrode, the sense electrodes being separated from the at least one reference electrode by at least one shield electrode, the reference capacitance cancellation selected from the set consisting of localized reference capacitance cancellation, column-shared reference capacitance cancellation, and array-shared reference capacitance cancellation; and
reconstructing at least a portion of a fingerprint, based at least in part on the measured capacitance; wherein
said transistor components are formed on a common substrate with said plurality of sense electrodes.

35. A method of operating a capacitive sensor having a plurality of sensor electrodes to detect capacitive variations associated with an interaction between a finger and the capacitive sensor, comprising:
locating all electronic circuits other than the plurality of sensor electrodes physically outside an area associated with interaction between the sensor and the finger and on a substrate on which the plurality of sensor electrodes are formed;
sensing variations in capacitance among the plurality of sensor electrodes; and
canceling capacitances in the sensed variations in capacitance among the plurality of sensor electrodes using reference capacitance cancellation using at least one reference electrode, the sense electrodes being separated from the at least one reference electrode by at least one shield electrode, the reference capacitance cancellation selected from the set consisting of: localized reference capacitance cancellation, column-shared reference capacitance cancellation, an array-shared reference capacitance cancellation, and a row-shared reference cancellation.

36. A capacitance sensor device in an integrated circuit comprising:
a sensor electrode array arranged in a two dimensional array of n rows and m columns;
a shield electrode array arranged in a one dimensional array of m columns and each configured to provide shielding between a column of sensor electrode and at least one reference electrode;
a quantity of m charge pump circuits;
a quantity of m amplifiers each having an input connected to a respective one of the charge pump circuits and an output connected to a respective shield electrode in the shield electrode array;
first m groups of n switches, each of the first m groups of n switches associated with a respective column in the sensor electrode array and coupled between respective ones of the sensor electrodes in the column and the output of a respective one of the m amplifiers; and
second m groups of n switches, each of the second m groups of n switches associated with a respective column in the sensor electrode array and coupled between respective ones of the sensor electrodes in the column and the output of a respective one of the m charge pumps.

37. The capacitance sensor device in claim 36, wherein no switching devices within the integrated circuit are beneath or between any sensor or shield electrodes.

38. A capacitance sensor device in an integrated circuit comprising:
- a sensor electrode array arranged in a two dimensional array of n rows and m columns;
- a shield electrode array arranged in a one dimensional array of m columns;
- a quantity of m charge pump circuits each having an output connected to a respective shield electrode in the shield electrode array;
- a quantity of m switch cancellation circuit each configured to switch between first and second output levels synchronously with an output of the respective one of the charge pump circuits;
- first m groups of n switches, each of the first m groups of n switches associated with a respective column in the sensor electrode array and coupled between respective ones of the sensor electrodes in the column and the output of a respective one of the m switched level drivers; and
- second m groups of n switches, each of the second m groups of n switches associated with a respective column in the sensor electrode array and coupled between respective ones of the sensor electrodes in the column and the output of a respective one of the m charge pumps.

39. The capacitance sensor device of claim 38, wherein the first output level is Vcc and the second output level is ground.

40. A capacitance sensor device in an integrated circuit comprising:
- a sensor electrode array arranged in a two dimensional array of n rows and m columns;
- a shield electrode array arranged in a one dimensional array of n rows;
- a quantity of m charge pump circuits;
- a quantity of n switched level drivers each having an output connected to a respective one of the n shield electrodes, and when addressed, switching synchronously to a selected one of the charge pump circuits and between output levels of Vcc and 0; and
- a quantity of m blocks of n switches, each block of n switches corresponding to a column in the sensor electrode array and coupled between respective ones of the sensor electrodes in the column and one of the m charge pump circuits.

41. The capacitance sensor device of claim 40, wherein no switching devices within the integrated circuit are beneath or between any sensor or shield electrodes.

42. A capacitance sensor system comprising:
- a plurality of sensor electrodes;
- a plurality of shield electrodes each configured to provide shielding between at least one sensor electrode and at least one reference electrode;
- a plurality of charge pump circuits each associated with a group of sensor electrodes; and
- a plurality of switch cancellation circuits each associated with at least one shield electrode and configured to switch synchronously with a switch in a respective one of the charge pump circuits; wherein
- at least one of the plurality of shield electrodes is disposed in a plane that is offset along a vertical axis from a different plane in which at least one of the plurality of sensor electrodes is disposed.

\* \* \* \* \*